United States Patent [19]
Rossignol et al.

[11] Patent Number: 5,277,148
[45] Date of Patent: Jan. 11, 1994

[54] WEARABLE PET ENCLOSURE

[76] Inventors: Elaine A. Rossignol; Michael A. Kominsky, both of P.O. Box 12189, Zephyr Cove, Nev. 89448

[21] Appl. No.: 870,359

[22] Filed: Apr. 17, 1992

Related U.S. Application Data

[63] Continuation-in-part of Ser. No. 608,672, Nov. 5, 1990, abandoned.

[51] Int. Cl.⁵ .................... A01K 13/00; A01K 29/00
[52] U.S. Cl. .................................................. 119/19
[58] Field of Search .................. 119/96, 15, 17, 19; 224/166, 161, 191, 270, 215, 209, 920, 921, 259; D30/108, 109

[56] References Cited

U.S. PATENT DOCUMENTS

| | | | |
|---|---|---|---|
| 3,850,144 | 11/1974 | Springer et al. | 119/19 |
| 4,977,857 | 12/1990 | Slawinski | 119/19 |

FOREIGN PATENT DOCUMENTS

| | | | |
|---|---|---|---|
| 2354727 | 2/1978 | France | 119/19 |
| 2476461 | 8/1981 | France | 119/19 |

*Primary Examiner*—Gene Mancene
*Assistant Examiner*—Thomas Price
*Attorney, Agent, or Firm*—Thomas M. Freiburger

[57] ABSTRACT

An enclosure for small animals which is wearable on the front or back of an animate bearer. Straps are attached to a solid base upon which a complete enclosure is fastened. The straps allow the pet enclosure to be suspended from the shoulders and waist of a bearer, fully freeing the arms and hands. The enclosure is substantially transparent and completely air-permeable, allowing the pet to view outside events and to experience the textures of the outdoors in safety and comfort. A solid base forms the floor of the enclosure allowing the pet to have firm footing, as well as room to sit, stretch, or lie down. The base is of a recessed configuration, contoured to the body of the bearer to provide distribution of the animal's weight close to the bearer and centered for balance, as well as to provide a means for containing pet waste where it can be easily cleaned. Ample access to the enclosure is provided by fasteners in both the front and rear of the enclosure, from both the left and the right sides. The enclosure is flexible when erect allowing use in limited spaces, yet sufficiently resilient to return to its original shape. Optionally, the enclosure is transformable into a hand-carried enclosure; it also interfaces with a seat of a vehicle, and is fully collapsible for easy storage. This invention is a complete enclosure which provides containment and control of an enclosed pet, allowing small animals to be included in many activities which would not otherwise be practical or possible.

37 Claims, 6 Drawing Sheets

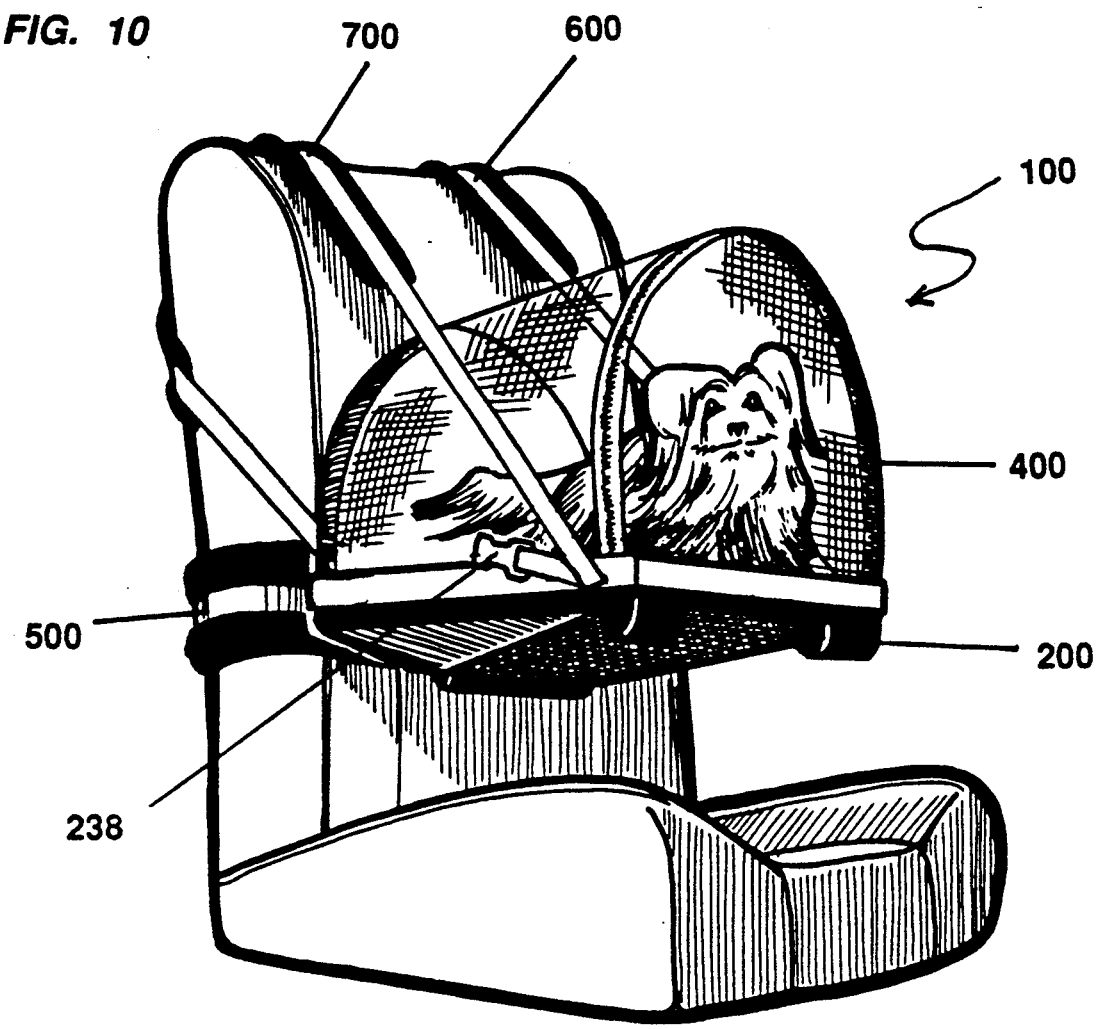

WEARABLE PET ENCLOSURE

REFERENCE TO RELATED APPLICATION

This application is a continuation in part of application Ser. No. 608,672 filed Nov. 5, 1990, now abandoned.

BACKGROUND OF INVENTION

This invention is generally related to the field of pet carriers, and specifically to a lightweight collapsible enclosure which can be worn on the front or back of an animate bearer, enabling pet owners to include their domestic pets in activities heretofore not practical or possible.

Pet carriers to date have been generally confined to two categories: 1) Enclosures constructed of solid material such as plastic, or flexible material such as nylon fabric, with a handle and/or strap for carrying; and 2) Sack-like receptacles for pets made of flexible material such as nylon or cotton, with straps for the shoulders and/or waist of the bearer and designed to be worn.

The primary disadvantage of the sack-like carriers has been that the pet within has no rigid footing and hence is not held in comfort. Also, the sack-like carriers have not entirely enclosed the pet as is required for access to many public places; this further poses a danger for the pet to escape, as the pet is not fully contained. Additionally, the matter of pet waste has not been addressed in these carriers.

The enclosures constructed of solid material such as plastic have been rigid carriers with handles, and deficient in that the bearer's hands are occupied, and also these carriers generally have not been adjustable in size, and many have had limited ventilation and/or viewability for the pet.

The flexible enclosure carriers with handles and/or straps have been deficient in that the bearer's hands or arms are required even with the use of a shoulder strap, in order to balance the weight of the pet on an animate bearer, or to prevent the strap from slipping off the shoulder. These carriers are not truly wearable, but more precisely comport with the category of those which are carried on a shoulder of an animate bearer. The primary disadvantage of the single shoulder strap carriers is that the weight distribution of the load is asymmetrical, unbalanced, and therefore uncomfortable on the animate bearer, thus requiring the use of the bearer's arms or hands to steady the load to prevent subjecting the enclosed animal to jolting action during transport. A further disadvantage is that many of these enclosures tend to collapse onto themselves and the pet within when the carrier is set down and the handle is released. Yet another disadvantage of these prior carriers is limited ventilation and/or viewability for the enclosed pet.

The present invention overcomes these limitations by providing an adjustable, collapsible, full enclosure which is substantially transparent and fully air-permeable, and retains its shape when set down. Moreover, the present invention can be worn conveniently fully freeing the arms and hands. In this worn configuration, the lightweight enclosure is attached to shoulder and waist straps in a balanced manner, and can be worn centered on the front or back of an animate bearer. The rigid base is patterned to center the pet's weight close to the body of the animate bearer. This feature encourages the respective masses of the enclosure/pet and the animate bearer to become tangent and the centers of gravity to nearly coincide on a central horizontal axis, thereby mitigating the inherent conflict of inertia of two independent moving masses. The result is a positive and consistent center positioning of the load, with optimized stability when the enclosure is worn, thus fully freeing the arms and hands. The intersecting downward planes of the floor of the base also allow for the concentration of pet waste where it may be easily removed.

The present invention is a full enclosure which restrains the animal safely and comfortably within. Because of the pliant properties of the enclosure and its structural members, the enclosure is also comfortable against the body of the bearer when worn. Further, the enclosure is self-adjustable in size and shape for placement in confined spaces such as under airline seats, yet possesses enough resiliency to spring back to its original shape and size ehen no longer in a confined space.

The present invention further offers a versatility heretofore not found in pet carriers. The enclosure is not only wearable, but it may also be easily configured into a convenient hand-carried mode.

The invention further is attachable in an elevated position to the rear or to the front of the seatback of a passenger seat in a vehicle, for safely containing and restraining a pet while enabling enclosed pet to view the outside. It may also interface with a vehicular seat belt in a non-elevated position, for accommodating the various pet transport needs of the pet custodian.

The following patents and publications are cited as being pertinent to the subject matter of this invention, although all are distinguishable from the invention:

| U.S. Pat. DOCUMENTS | |
|---|---|
| INVENTOR | U.S. PAT. NO. |
| Halpin, A. | 2,538,778 |
| Patten, J. | 3,156,213 |
| Schluttig, P. L. | 3,481,311 |
| Priddy, Jr. W. S. | 3,509,855 |
| Springer, et al. | 3,850,144 |
| Albright, D. J. | 4,220,119 |
| Yamamoto, Y. | 4,484,540 |
| Doyle, R. L | 4,644,902 |
| Delino, Jr. J. | 4,781,147 |
| Davis, L. D. | 4,803,951 |
| Goetz, C. R. | 4,852,520 |
| Slawinski, N. | 4,977,857 |

| OTHER PUBLICATIONS | | |
|---|---|---|
| PUBLICATION | ISSUE/PAGE # | TITLE |
| Pedigrees, The Pet Catalog | Christmas, 1989, p. 19 | "Personalized Pet Carrier" |
| Pedigrees, The Pet Catalog | Christmas, 1989, p. 19 | "Pet Car Seat" |
| Pedigrees, The Pet Catalog | Christmas, 1989, p. 07 | "Pet Safety Belt" |
| Pedigrees, The Pet Catalog | Christmas, 1989, p. 14 | "Pet Carrier" |
| Pedigrees, The Pet Catalog | Christmas, 1989, p. 25 | "Pet Totes" |
| Pedigrees, The Pet Catalog | Christmas, 1989, p. 35 | "Totes" |
| Du-Say's Catalog | Spring, 1989, p. 31 | "Carry Your Pet Anywhere" |

-continued

| | OTHER PUBLICATIONS | |
|---|---|---|
| PUBLICATION | ISSUE/PAGE # | TITLE |
| Du-Say's Catalog | Spring, 1989, p. 31 | "Fits Under Any Airline Seat" |
| Du-Say's Catalog | Spring, 1989, p. 31 | "Ridin' High Car Seat" |
| Du-Say's Catalog | Spring, 1989, p. 31 | "Buckle Up Your Pet" |
| Master Animal Care Catalog | Spring, 1990, p. 10–11 | "Carriers" |
| Cat Care Catalogue | Spring, 1990, p. 6 | "Cabin Kennel" |
| Pedigrees, The Pet Catalog | Holiday, 1990, p. 4 | "Pet Totes" |
| Cat Fancy Magazine (Monthly) | Spet., 1990, p. 60 | "Pac-A-Pet" |
| Animail Pet Care Products | circa 1991 p. 20 | "Sherpa Bag" |

The Springer (U.S. Pat. No. 3,850,144) patent teaches the use of a portable pet carrier made of woven fabric and having a stiff bottom insert. However, the Springer device contemplates that the animal's head will extend out of the enclosure, which can produce discomfort in some animals when thus restrained about the neck. Without full enclosure of the pet such as provided by the present invention, the Springer carrier is inadequate for situations where full enclosure is necessary, such as within airline cabins. Further, the Springer carrier has only one strap and therefore only one attachment point on the bearer, thus distributing the pendulous weight of the enclosed pet uncomfortably on the bearer for any extended period of time. This limits the mobility of the bearer for various activities, as well as causing a turbulent ride for the pet passenger unless the arms or hands are used to steady the carrier when the bearer is in motion. The present invention overcomes these problems with multiple points of attachment which center and stabilize the enclosure on the bearer, fully freeing the arms and hands, and is comfortable to wear. The weight of the pet is concentrated to the rear center of the base and close to the torso of the bearer preventing the enclosure from bouncing and swinging when the bearer is in motion.

Other pet totes which have been marketed, "Doggi-Dudd" (Pedigree, the Pet Catalog, Holiday 1990, p.4) and "Sherpa Bag" (Animal Pet Care Products. circa 1991, p.20), utilize the same basic elements of design as Springer, and therefore suffer from the same design disdvantages enumerated above relative to Springer, with the exception of 1) no dedicated aperture for the head of the pet; and 2) incorporating ventilation panels inserted on two of the four flaccid sides of the carrier. The "Doggi-Dudd" and the "Sherpa Bag" carriers completely collapse onto the enclosed pet when the carrier is set down and the handle is released.

The patents to Albright (U.S. Pat. No. 4,220,119), Yamamoto (U.S. Pat. No. 4,484,540), Patten (U.S. Pat. No. 3,156,213), Halpin (U.S. Pat. No. 2,538,778), and Schluttig (U.S. Pat. No. 3,481,311) teach portable collapsible pet carriers which require use of the hands for either carrying or steadying the device. The present invention is a significant advance over these devices in that it 1) comprises a lightweight less cumbersome easily convertible design which can either be hand-carried, or worn; and 2) remains erect yet pliant when deployed and therefore self-adjustable in height and shape; and 3) completely frees the arms and hands when worn, and balances the enclosure weight and load allowing the bearer to include the pet in activities such as bicyling, hiking, boating, and so on.

The Doyle (U.S. Pat. No. 4,644,902) patent teaches a pet carrier comprising a sling of flexible sheet material having a body portion with holes for receiving the pet's legs, and which may be slung over the shoulder or carried in the hand. Transporting a pet in this manner can cause discomfort and even panic in some animals, while further suffering from the disadvantages of a carrier which is not an enclosure. The present invention differs substantially in that it is a full enclosure, with a comfortable footing for the animal, designed preferably to be worn centered on the front or back of the bearer.

A similar device known is "Personalized Pet Carrier" (Pedigrees Pet Catalog Christmas 1989 p.19). It is a wearable apron-like carrier with a front pouch for carrying a pet, and has no solid base for the pet's footing or for its waste, and no manner of restraining the pet from escape or falling out. In addition, this device is 1) not designed to be hand-carried, but only to wear; and 2) not a full enclosure.

Another similar device has been commercially available under the name "Pac-a-Pet" indicating a U.S. Patent Pending (Cat Fancy, September 1990 p.60). The product is 1) is not designed to be hand-carried, but only to wear; 2) has no solid base, making it difficult or impossible for a pet within to stand, sit, stretch or lie down; and 3) is not an enclosure, but rather utilizes a collar clasp to control/restrain the pet by the neck.

The patent to Davis (U.S. Pat. No. 4,803,951) teaches a collapsible pet enclosure with mesh walls. However, Davis differs from this invention in that the device of Davis is only designed for use in a motor vehicle, and only to attach to the frame of a car window. The present invention is a considerable improvement over Davis in that it is adaptable; it can be 1) worn; or 2) hand-carried; or 3) free-standing; or 4) interfaced with a conventional waist seat belt on a seat in vehicles, to protect pet from injury, to protect driver from distraction, and to protect upholstery from pet waste.

Car restraints for pets such as that shown in other publications (Du-Say's Spring 1989 p.31. and Pedigrees, The Pet Catalog Christmas 1989 p.7, and p.19) either: 1) are insufficiently small restricting the pets from lying down; 2) fail to supply a base protecting the car seat from the pets; and/or 3) harness an animal in a position which may be uncomfortable for extended periods of time.

The Delino (U.S. Pat. No. 4,781,147) patent teaches a portable pet carrier having an inverted wire basket hinged onto a rigid flat base, with an opening at the top of the wire basket for an animal's head. The Delino device is adapted to be mounted on the back of a bicycle or held to the seat of a car by a seat belt. Unlike the present invention, it is not adaptable for wearing, and is not a full enclosure.

The patent to Goetz (U.S. Pat. No. 4,852,520) teaches a portable pet carrier with a handle and wheels which may be carried or pulled. It may be disassembled into two halves, but is not collapsible or adjustable in height, nor can it be worn. It is a variation of the most common type of pet carrier on the market.

The patent to Slawinski (U.S. Pat. No. 4,977,857) teaches a bag-like carrier with wheels which can be carried or pulled. It more closely comports with and suffers from the same disadvantages as enumerated above with respect to Albright, Yamamoto, Patten, Halpin and Schluttig, which are portable pet carriers requiring the use of the hands to steady the unbalanced load while carrying. Because none of these carriers provides multiple points of attachment designed to insure a constant and centered stable positioning of the load, the hands cannot be free, nor can the user be comfortable while in motion. The present invention overcomes these disadvantages by completely freeing the arms and hands when worn centrally, and constantly balancing the weight of the enclosure and the load through a wide range of motion.

The device referred to as "Cabin Kennel" (Cat Care Catalog, Spring 1990, p.6) is designed specifically for use under an airline seat. This device fails to offer humane sitting/standing/stretching room for the pet, as promulgated by the American Society for the Prevention of Cruelty to Animals (ASPCA). The present invention, being flexible, may fit under an airline seat when required, but may also then be positioned on an custodian's lap during appropriate times of the flight, enabling the pet to be comforted by the custodian, or allowing the pet to sit/stand/stretch within the enclosure while complying with the present rules and policies of many common carriers such as airlines.

The device referred to as "Fits Under Any Airline Seat" (Du-Say's Catalog Spring 1989 p.31) is not a full enclosure as required by most common carriers.

Pet enclosures which are flexible (Cat Care Catalog Spring 1990 p.6, and Pedigrees The Pet Catalog Christmas 1989 pp.14, 25 and 35, and Du-Say's Spring 1989 p.31) which are flexible, share the primary disadvantages of 1) being marginally ventilated or transparent; and/or 2) being limited to carrying by hand or on one shoulder in an unbalanced fashion; and/or 3) collapsing onto the enclosed pet when set down.

Pet enclosures which are rigid (Master Animal Care Spring 1990 pp.10 and 11) share the primary disadvantages of 1) requiring hand-carrying 2) not being adjustable in height, and 3) not being completely collapsible.

The remainder of the listed prior art patents and publications diverge more starkly from the present invention.

The wearable pet enclosure combines two elements as its primary objective heretofore not accomplished in pet carriers: 1) wearable, and 2) enclosure, in addition to the other important features in preferred and more specific embodiments. As shown, prior carriers which are complete enclosures have not been wearable, and wearable carriers have not been complete enclosures.

Accordingly, it is a primary object of this invention to provide a means for carrying a pet in a fashion which allows the bearer to wear the device comfortably with arms and hands free to perform other tasks. Prior carriers have had a handle for hand carrying, or a shoulder strap which is not truly wearable, but rather requires the arm(s) or the hand(s) to steady the device, or to keep it from slipping off the shoulder.

A further object of this invention is to provide multiple points of attachment to the body of the bearer thereby distributing the weight of the wearable pet enclosure centered and resistant to independent motion.

Another object of this invention is to provide a device which completely encloses a pet while optionally providing the pet with a clear view of outside events, while also being viewable by outside observers. The enclosure of the present invention further provides unlimited ventilation for the pet within, while protecting the pet from insects, pests, and many common outdoor dangers.

Another further object of this invention is to provide a pet carrying device which has a rigid floor allowing the pet to stand, sit, stretch or lie down while being transported. The rigid base also provides a positive fastening means for the wearable strapping suspension which preferably is threaded through the various front and rear strap slots formed in the base. Buckles or other fastening means may be affixed to the ends of the suspension strapping to facilitate use and reconfiguration from the wearable to the carriable mode.

Another further object of this invention is to provide a recessed portion of the rigid floor for centering the pet's weight close to the body of the bearer, as well as for accumulating pet waste where it can be contained and easily cleaned.

Another further object of this invention is to provide a means by which the enclosure may be adjustable in height by deforming the enclosure, allowing the enclosure to fit in locations of restricted or irregularly shaped volume such as under airline seats or various other constrained travel environments.

Another further object of this invention is to provide a means by which the empty enclosure may be completely collapsed for storage in smaller spaces.

Another further object of this invention is to provide a pet enclosure which is not only wearable, but also easily hand-carriable by a bearer; this dual purpose has not been available in other pet carriers.

Another further object of this invention is to provide a complete enclosure which can be attached to the front or to the rear of the seatback of a vehicular seat, by fastening the shoulder suspension straps and waist straps around the seatback. This application contains and restrains the pet in an elevated postion while allowing the enclosed to pet to view the outside.

It is yet a further object to provide an enclosure which can accommodate seat belts for safety within a vehicle, while yet allowing adequate room for a pet's comfort while so restrained.

Another further object of this invention is to provide a cover for the pervious walls of the carrier to protect the pet within from outside elements when necessary.

Yet another object is to provide a pouch attached to the enclosure for carrying such a cover, as well as for carrying a limited amount of pet supplies.

A further object is to provide a wearable pet enclosure, which is traffic safety-conscious, utilizing brightly colored contrasting trim integrated at strategic locations of the suspension straps and the enclosure for maximum visibility while walking, hiking, biking and so forth.

Another further object of this invention is to provide access by the hand of the bearer to the inside of the enclosure, from the top, front and back of the carrier and also from the left or the right side. This facilitates placing or removing the animal within, petting the animal, or cleaning any waste. Additionally, the entire tent enclosure which fastens to the base is removable to further facilitate cleaning the base or the enclosure.

Viewed from a first vantage point it is an object of this invention to provide a lightweight wearable and carriable pet enclosure protecting the pet from many outside hazards and thereby giving the pet a sense of security, while yet allowing the pet to experience the stimulus of the outdoors and view outside events. Many indoor pets have a curiosity about the outdoors, but live in areas where it is inappropriate or unsafe to allow them outside.

It is a further object of this invention to provide a enclosure which is well-suited for a variety of animals such as small-breed dogs up to 20 pounds, cats, and rabbits. A perch option is also included in this enclosure for pet birds.

Viewed from a second vantage point it is an object of this invention to enable pet owners to include a pet in activities for which carriers currently available are not suited, such as hiking, fitness walking, bicycling, boating, camping, and other excursions.

It is a further object of this invention to provide an alternative to leashes which are not well suited for some pets; this invention provides a means by which the indoor pet's need for outdoor stimulation may be safely satisfied, while bringing enjoyment and novelty heretofore unavailable to the pet owner.

Viewed from a third vantage point it is an object of this invention to provide a wearable platform which supports animals without requiring the use of arms or hands, comprised of a custom-contoured rigid base which conforms on one side to the body contour of a bearer, a plurality of suspension straps which attach to the base and extend around the waist and shoulders of the bearer, a raised edge preferably formed with the floor around the perimeter of the base and extending upward which helps the platform to retain objects thereon, and a pervious tent which removably attaches to the base, completing the enclosure.

As demonstrated above, prior pet carriers which have comprised complete enclosures require the use of arms or hands to carry or to steady the load on one shoulder of the bearer, making such carriers more closely related to the category of carried enclosures and not truly wearable. When worn in a preferred manner, the wearable pet enclosure becomes a synergistic embodiment of the bearer and allows and promotes intimate interaction with the enclosed pet, even while the bearer is in ambulatory motion. The primary distinction between carrying and wearing in this context, is that when worn, the present invention behaves as a seamless balanced extension of the torso of the bearer, completely freeing the arms and hands while providing a complete enclosure for the pet.

Other carriers which have been designed to be worn and to free the hands have not been complete enclosures, but have been sac-like, and inadequate for the comfort and safety of the pet, as well as inappropriate for many situations where a full enclosure is required. None of the prior carriers have had a dual purpose such as the present invention, allowing for the easy and complete transformation of use from the wear-mode to the hand-carry mode. Furthermore, no pet enclosure to date has provided a entirely wearable enclosure leaving the arms and hands completely free.

Further objects and advantages of this invention will become apparent from consideration of the drawings and ensuing description.

SUMMARY OF THE INVENTION

The principal objective of this invention is to provide a complete pet enclosure which can be worn on the front or back of an animate bearer fully freeing the arms and hands, and can also be interfaced with a seat of a vehicle for travel, and can be easily transformed into a convenient hand-carried enclosure.

This invention supports a pet to be transported upon a rigid base. The base is preferably formed of vacuum molded plastic or like material with a recessed portion on the side of the base closest to a user, which tends to keep the pet close and centered to the bearer for balanced carrying, and also collects bodily wastes from the pet where they can be easily cleaned. In one preferred embodiment, structural support tubing attaches into tees on either side of the base forming a frame, and a pervious, substantially transparent tent fits over the frame attaching to the sides of the base with a removable basting-type edge fastener; zippers are included for access to the interior of the enclosure, as are pouches on an external surface of the tent for carrying an optional protective cover and various pet supplies.

While the description herein contains many specifications and details, these should not be construed as limitations on the scope of the invention, but rather as an exemplification of one preferred embodiment thereof. For example, the present enclosure preferably is made of mesh fabric providing ventilation and transparency, although the enclosure may also be comprised of more solid mesh material or cage-like slats which attach to the base.

The structural portions of the enclosure fold down against the base, providing total collapsibility for storage. When erect and deployed, the enclosure is pliant allowing placement in limited spaces such as under airline seats, and sufficiently resilient to return to its original shape and size when no longer constricted. Straps securely attach to the base which facilitate both hand carrying and attachment of the device around a bearer's waist and shoulders for wearing. The present invention is attachable by its straps to a seat of a vehicle, and can also interface with a seat belt within a vehicle to comfortably restrain a pet, while protecting the driver from distraction and protecting the upholstery from the pet.

This invention has numerous advantages as specified above; it is uniquely versatile due to the easy change from a "hand-carry" mode to a "wear" mode. The option of wearing the carrier fully frees the arms and hands of the bearer, allowing pet owners to include their pets in activities such as bicycling, boating, hiking, fitness walking, camping and other excursions heretofore impractical or even impossible with pets. This invention permits in particular: 1) indoor pets to experience the stimulus of outdoors in safety and comfort; and 2) better bonding between a pet custodian and the enclosed animal.

BRIEF DESCRIPTION OF DRAWINGS

FIG. 10 is a perspective view of the front of the invention with diagonal suspension straps and waist strap attached to the front of the seatback of a vehicular seat.

DESCRIPTION OF PREFERRED EMBODIMENT

Figure 1:
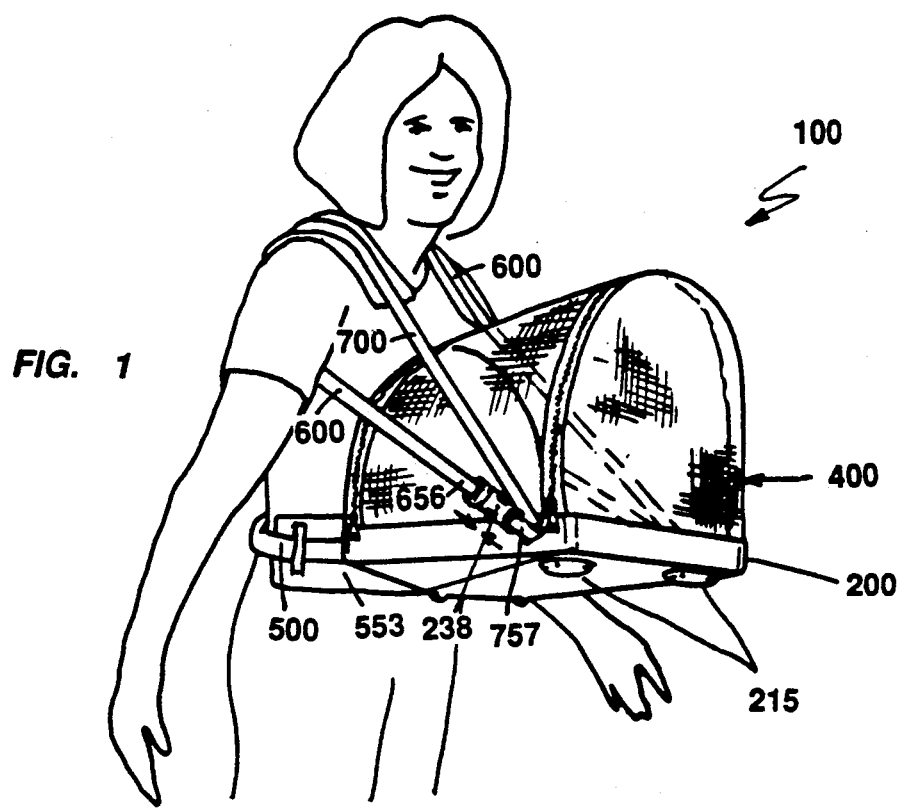
FIG. 1 is a perspective view of the invention of the wearable pet enclosure from the bearer's right front in a preferred embodiment in use on the front of a bearer, in a wearable configuration.
Figure 2:
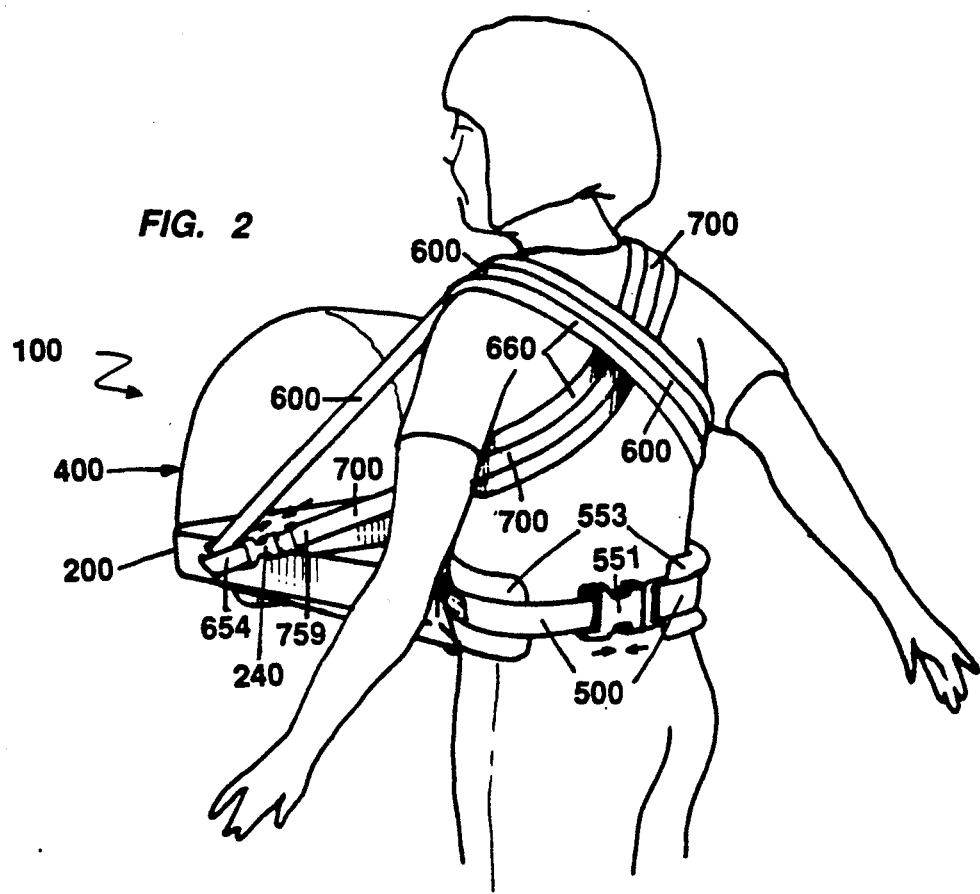
FIG. 2 is a perspective view of the invention from the bearer's left rear in a preferred embodiment of the invention in use on the front of a bearer, in a wearable configuration.

Referring now to the drawings wherein 1) left and right means bearer's left and right; and 2) front means that portion of the enclosure farthest from the bearer's body; and rear means that portion of the enclosure closest to the bearer's body, when the wearable pet enclosure 100 is being worn on the front of the animate bearer as shown in FIGS. 1 and 2.

As shown in FIGS. 1 and 2, the wearable pet enclosure 100 preferably is suspended on the shoulders and the waist of the user, fully freeing the arms and hands for other activities.

Figure 3:
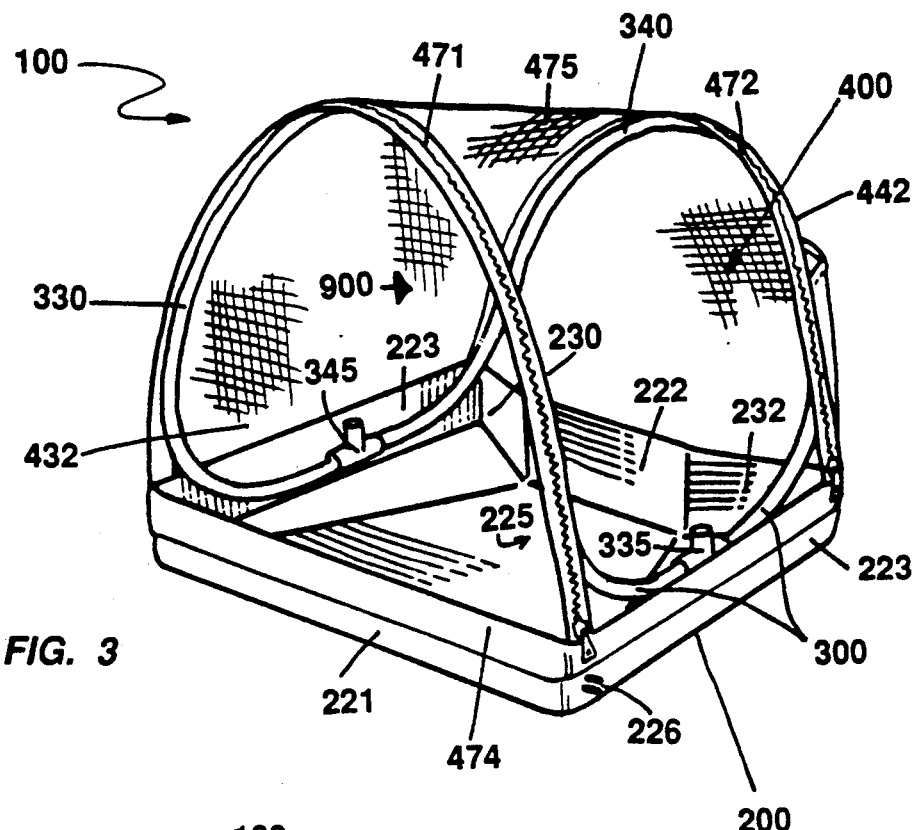
FIG. 3 is a perspective view of the invention without the straps and showing a preferred frame structure.
Figure 4:
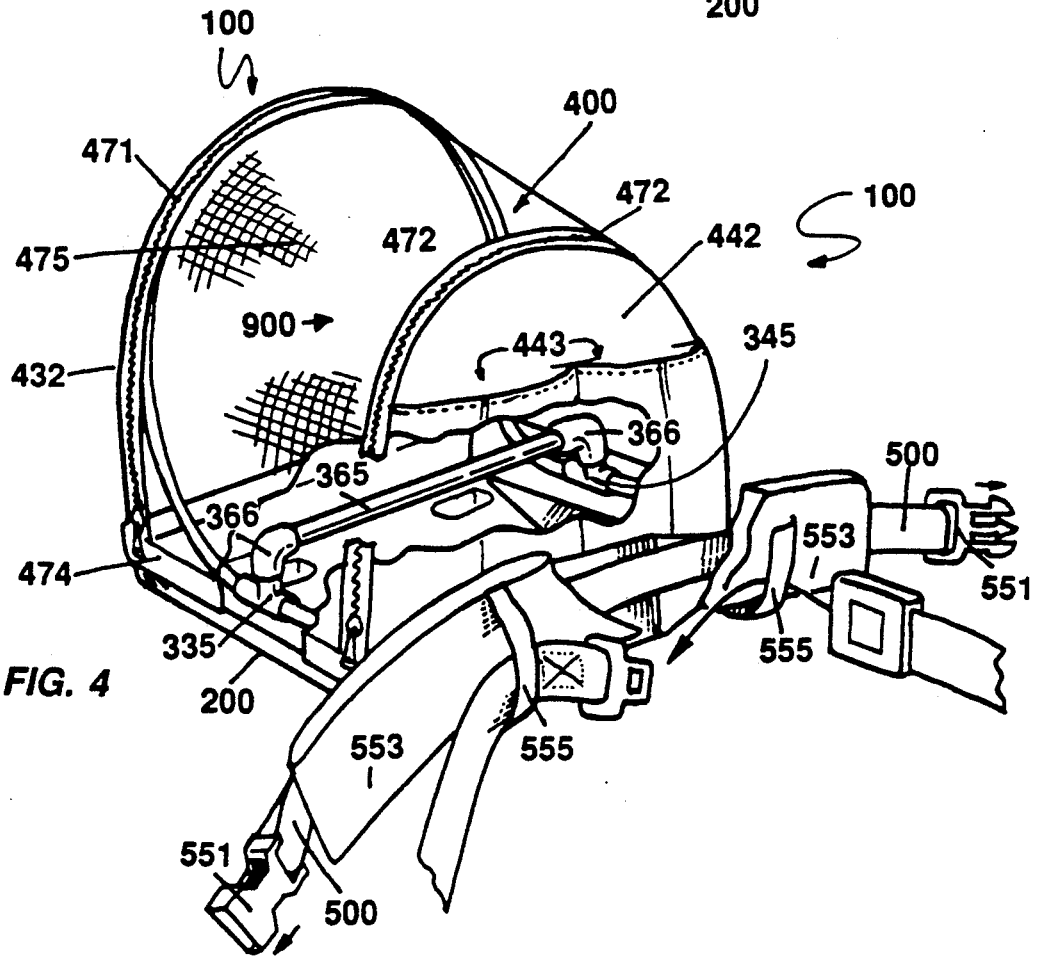
FIG. 4 is a perspective view of the rear of the invention, partially cut away to show a perch for a bird, and showing how the invention is fastenable to an automobile seat belt.
Figure 5:
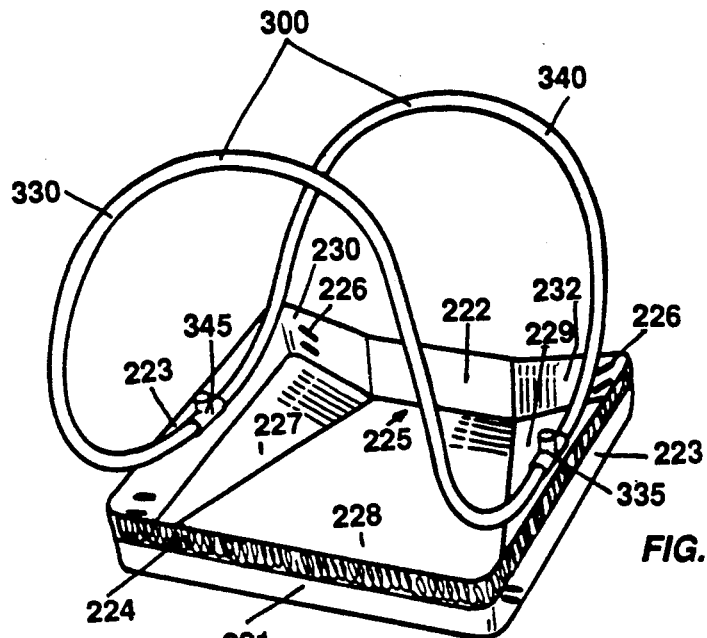
FIG. 5 is a perspective view of the front of the invention with a pervious fabric removed showing the structural components.
Figure 8:
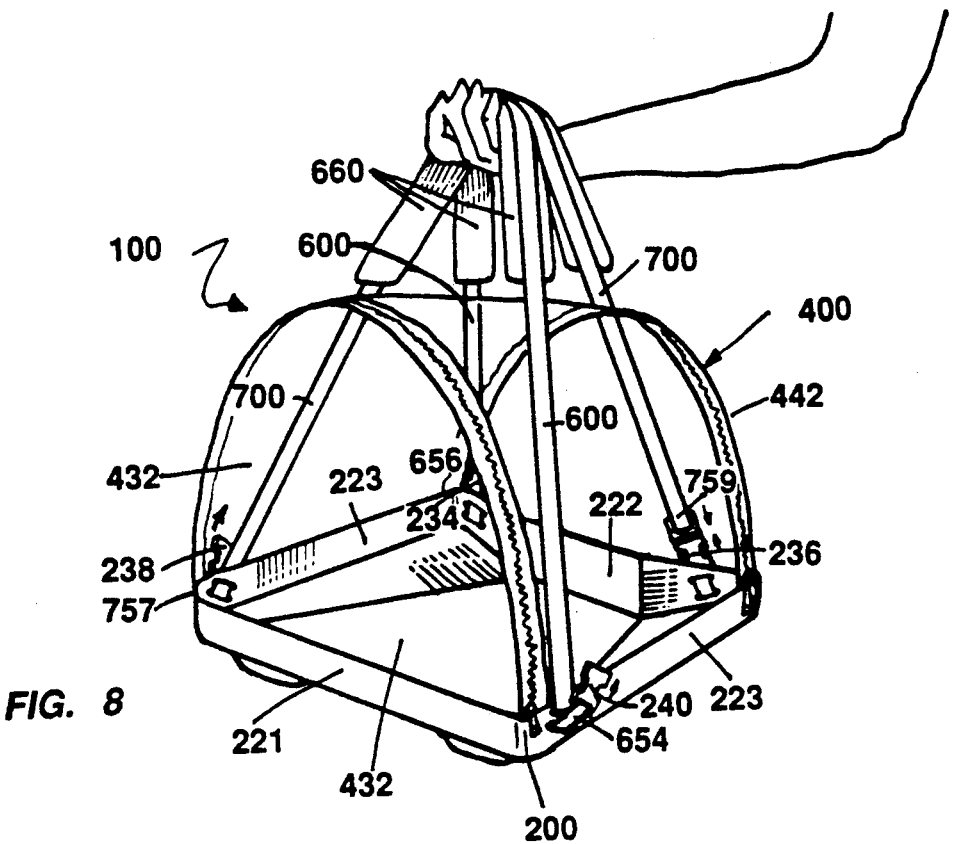
FIG. 8 is a perspective view of the front of the invention in use with suspension straps configured to the free-standing or hand-carrying mode, without showing the structural frame or waist strap for the sake of simplicity and clarity.

In essence, and as shown in FIGS. 3, 4, and 5, the enclosure 100 is comprised of a base 200 with a frame 300 attached thereon. The frame 300 is comprised of a front structural tube 330 and a rear structural tube 340. A transparent tent 400, or enclosure means such as of pervious fabric, fits over the frame 300 and attaches to edge walls 221, 222, 223, 230 and 232 of the base 200 forming enclosed space 900. In FIGS. 1 and 2, a waist strap 500, a first diagonal suspension strap 600, and a second diagonal suspension strap 700 attached to the base 200. The straps may be configured as shown FIGS. 1 and 2 for frontal wearing with the bearer's arms and hands free to perform other tasks, or configured for hand-carrying, as shown in FIG. 8.

Figure 9:
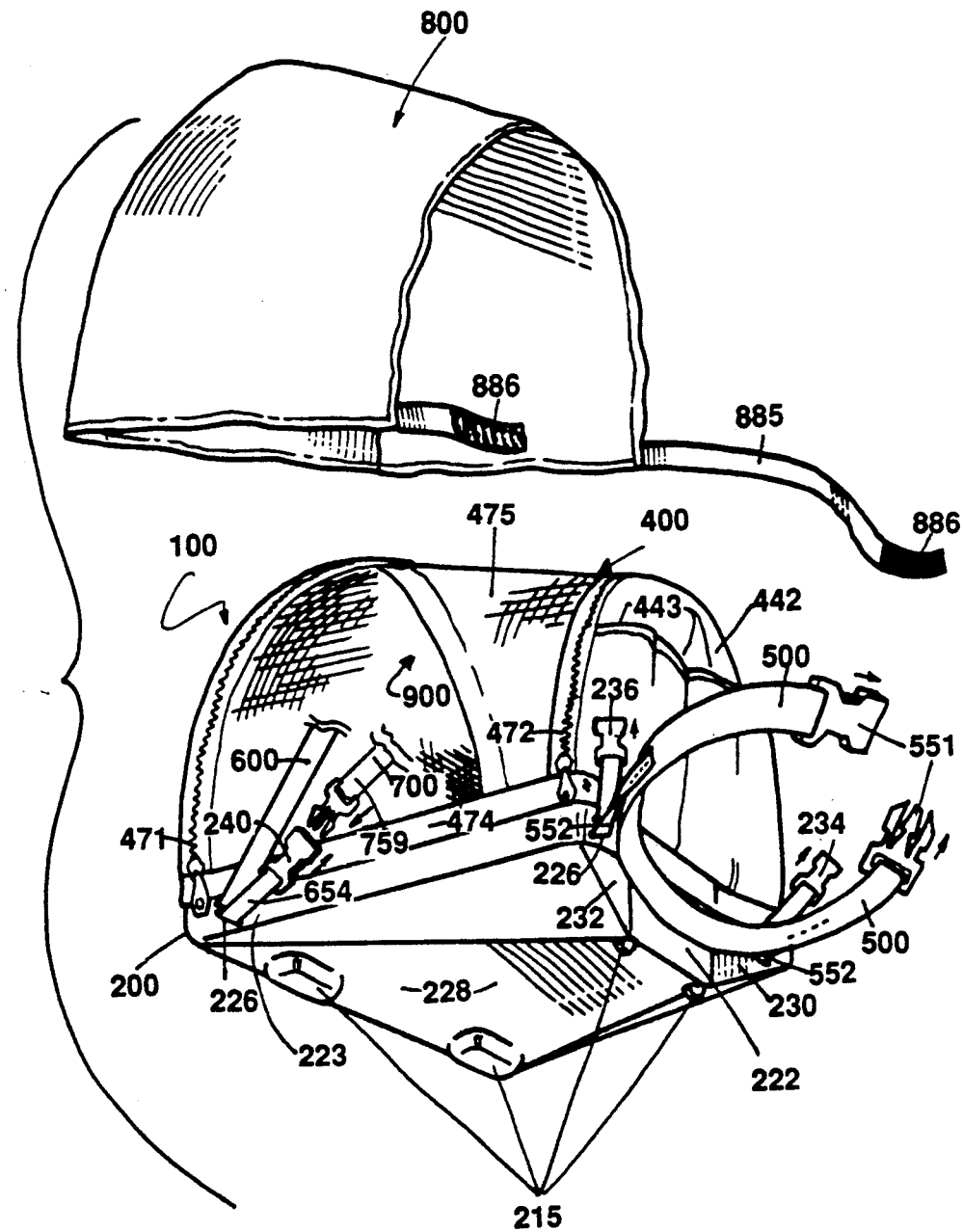
FIG. 9 is a perspective view of the rear and bottom of the invention 1) with selected diagonal suspension straps configured for wearing; 2) with a canopy shown ready to be fastened over the enclosure; and 3) without showing all of the suspension straps in their entirety, without the structural frame, and without the waist strap padding for the sake of simplicity and clarity.

As shown in FIG. 9, a canopy 800 is provided which can cover the tent 400, providing the enclosed pet with protection from outside elements.

Figure 6A:
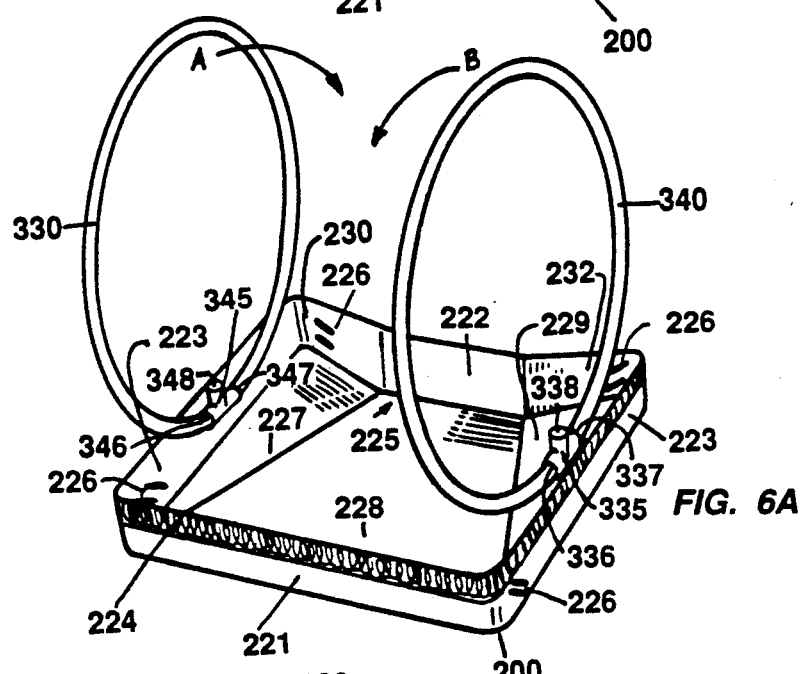
FIG. 6A is a perspective view of the front of the invention with structural supports reconfigured for collapsing into the base for storage.

As shown in FIGS. 6A and 9, strap slots 226, preferably formed in base 200, provide a fastening means for a waist connecting strap 552 to a waist strap 500 and for the diagonal suspension straps 600 and 700 to connect to the base 200. Further, buckles such as Fastex connectors, are affixed to the ends of the diagonal suspension straps 600 and 700 and the waist strap 500, for removable connection.

Referring now to FIGS. 3 and 5, the frame 300 of the enclosure 100 is shown in detail. The base 200 includes a periphery with a front edge wall 221 which is preferably longer than a back edge wall 222 and two equal length parallel side edge walls 223. The base 200 includes an angular planar floor portion 227 on the right, a central angular planar floor portion 228 and a left angular planar floor portion 229. Each floor portion is substantially planar. The central floor 228 is a trapezoid construct which slopes downward to the back edge wall 222. The left floor 229 and right floor 227 are triangular constructs which slope downward toward the central floor 228. The slopes of the three planes form a recessed portion 225 in the center rearward portion of the base 200. Right rear edge wall 230 and left rear edge wall 232 extend between back edge wall 222 and side edge walls 223. Back edge and rear edge walls 222, 230 and 232 collectively with adjacent floor portions form a "crescent" shape contoured to fit to the waist of the bearer, which is an important feature for the comfort of the bearer and the stability of the wearable pet enclosure 100.

Figure 7:
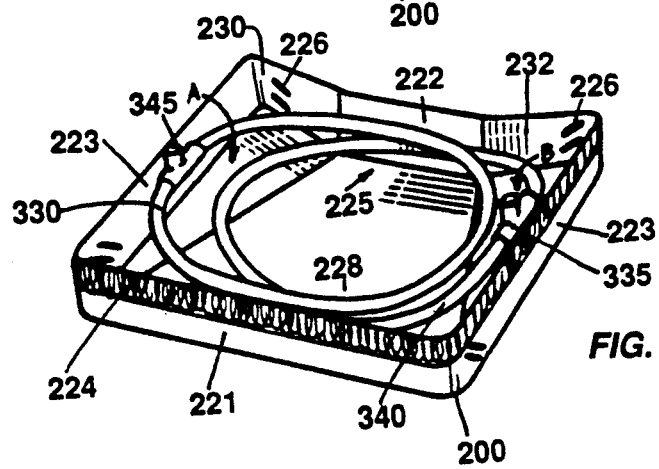
FIG. 7 is a perspective view of the front of the invention with structural supports collapsed into the base.

As shown in FIGS 5, 6A and 7, the base 200 preferably is substantially rigid, as described herein and in the claims. By "rigid" is meant rigid enough to withstand the weight of a 20-pound pet without noticeable deflection, at least not in the shaped configuration shown and described herein. However, although essentially rigid, the base can have some flexibility. For example it can produced by vacuum forming a 0.125 inch sheet of ABS plastic resulting in a finished thickness somewhat less, on the order of 0.063 inch or even thinner in some areas.

As shown in FIG. 5, a tent fastening means 224 such as Velcro is fixedly attached to an outer front surface of edge wall 221, the back and right and left rear edge walls 222, 230, and 232 respectively and the side edge walls 223 of the base 200. The recessed portion 225 helps to hold the pet near the bearer decreasing the torque exerted by the base 200 on the bearer by shifting the center of mass of the pet passenger nearer to the bearer.

The recessed portion 225 also collects any bodily wastes produced by the pet during extended periods in the wearable pet enclosure 100, even when used in a free-standing mode.

On the underside of the base 200, as shown in FIG. 9, are a plurality of base feet 215 which compensate for any minor unevenness while providing a firm foundation when the enclosure 100 is placed on the ground or upon other relatively flat surfaces. The feet 215, defined by rounded protrusions, preferably are integrally formed with the base 200 as are the edge walls 221, 222, and 223, as shown in FIG. 5, especially if the process of vacuum forming is utilized. As shown in FIG. 9, two of the front base feet 215 located at the front of base 200 form concave indentations in the front central floor 228 of sufficient volume to contain water or food inside the wearable enclosure 100 for the enclosed pet.

Figure 6B:
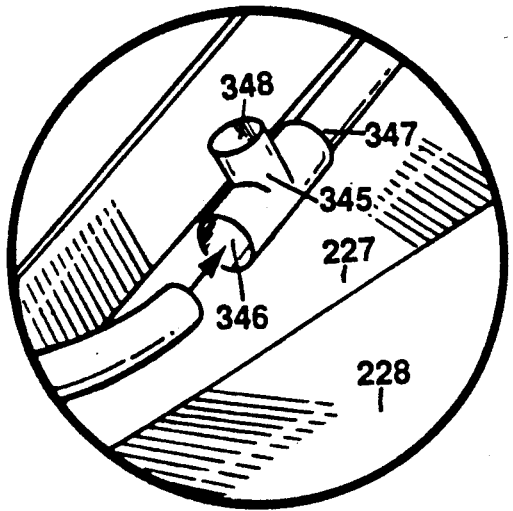
FIGS. 6B and 6C are perspective detail views of the base of the invention, showing connection of structural attachment tees to the structural tubular frame, and showing the structural supports connected to the tees.

Fixedly attached to the angular planar floor portion 227 on the right, on an upper surface thereof, is a right attachment tee 345 as depicted in FIGS. 5, 6A and 6B. The right attachment tee 345 has a front opening 346 and a rear opening 347 aligned in a horizontal axis and opposed from each other 180 degrees. A right perch opening 348 is formed in the right attachment tee 345 and opposed 90 degrees from the front opening 346 and the rear opening 347, as shown in FIG. 6B. When the front structural tube 330 is removed from front opening 336 of left attachment tee 335 and inserted into rear opening 347 of right attachment tee 345 and is rotated as indicated by arrow "A", the front structural tube 330 rotates within the right attachment tee 345 from the vertical orientation to a horizontal collapsed storage orientation as depicted in FIG. 7.

Figure 6C:
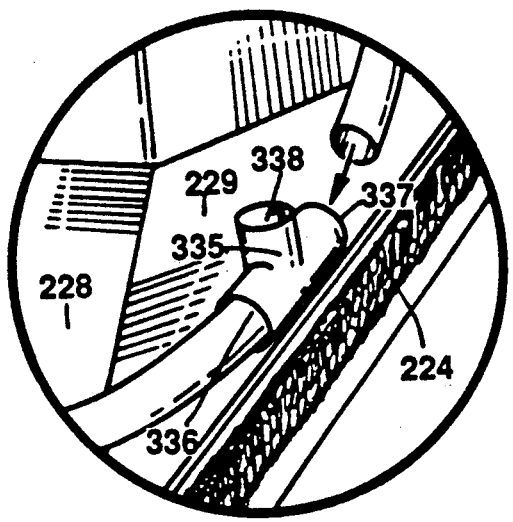

Fixedly attached to the left angular planar floor portion 229, on an upper surface thereof, is a left attachment tee 335 as depicted in FIGS. 5, 6A and 6C. The left attachment tee 335 has a front opening 336 and a rear opening 337 aligned in a horizontal axis and opposed from each other 180 degrees. A left perch opening 338 is formed in the left attachment tee 335 and opposed 90 degrees from the front opening 336 and the rear opening 337, as shown in FIG. 6C. When the rear structural tube 340 is removed from the rear opening 347 of right attachment tee 345 and inserted into front opening 336 of left attachment tee 335 and is rotated as indicated by arrow "B" the rear structural tube 340 rotates within the left attachment tee 335 from the vertical orientation to a horizontal collapsed storage orientation as depicted in FIG. 7.

As seen in FIGS. 4, 5 and 6C, a front structural tube 330 is removably attached both within the front opening 336 of left attachment tee 335 at one end of the tube and to the front opening 346 of the right attachment tee 345 at the tube's opposite end. In this deployed configuration, the front tube 330 bends to form a forward half of the frame 300 and is able to support a forward portion of the tent 400.

As seen in FIG. 4, 5 and 6B, a rear structural tube 340 is removably attached within the rear opening 347 of the right attachment tee 345 and is removably attachable to the rear opening 337 of the left attachment tee 335. In this deployed configuration, rear structural tube 340 bends to form a rearward half of the frame 300 and is able to support a rearward portion of the tent 400. Preferably, rear tube 340 is slightly shorter than front tube 330 so the carrier 100 diverges outwardly and forwardly, as seen in FIG. 1.

The front structural tube 330 and the rear structural tube 340 are designed of a material such as ⅜" polyethylene tubing, flexible enough to bend into position, as shown in FIGS. 6A and 7, and yet are rigid enough to support the tent 400 when in the first deployed configuration as shown in FIG. 5. The tubes are shown in the shape they assume with the enclosure means or the tent 400 installed. The frame 300 may bend further without breaking to allow the enclosure 100 to fit into confined spaces such as under an airline seat and will recover its original contour and size when no longer in a compressed state. As shown in FIG. 4, a perch 365 preferably made of a wooden dowel, terminates into a 90 degree perch mounting elbow 366, and may be positioned between the left perch opening 338 of left attachment tee 335 (FIG. 6C) and the right perch opening 348 of right attachment tee 345 (FIG. 6B), providing a stand for pet birds.

Referring now to FIG. 3, the tent 400 is shown in place over the frame 300. The tent 400 is held up by the erected front structural tube 330 and the rear structural tube 340 of the frame 300. The tent is held down against the base 200 by a base fastening means 474 as shown in FIG. 9 such as Velcro fixedly attached to the tent 400, which mates with the tent fastening means 224 depicted in FIGS. 5, 6A and 7. In this way the tent 400 is removably attachable to base 200.

FIG. 3 shows the tent enclosure 400 which essentially is a frustum or truncated cone bisected along the axis of the center of the major and minor diameters forming the upper portion of the enclosed space (although it may take other shapes as desired). The area adjacent to the plane of bisection overlaps with the base 200 thereby forming the enclosed space. Two generally half-circle flat walls of the tent 400 form a front wall 432 and a back wall 442 (FIG. 4) of the enclosure 400. The curved surface between the two half-circular walls is a top wall 475 as shown in FIGS. 3 and 4. Preferably the front wall 432 is larger than the back wall 442. This allows the enclosed pet a large viewing surface in the forward direction. The front wall 432 and the top wall 475 are preferably of a substantially transparent foraminous mesh screen-like material, allowing the pet to be viewed as well as allowing the pet to view events outside the enclosure 400. The back wall 442 against the bearer is preferably made of opaque material. Pouches 443 may be formed on the back wall 442, to hold a variety of pet accessories.

Along the front edge of the top wall 475 is a front fastener 471, as shown in FIG. 3, such as a zipper connecting the front wall 432 and the top wall 475 together. When opened, the front fastener 471 provides access to the enclosed space. Along the rear edge of the top wall 475 is a back fastener 472 (FIG. 4) such as a zipper connecting the back wall 442 and the top wall 475 together. When opened, the back fastener 472 provides further access to the enclosed space.

Referring now to FIGS. 4 and 9, a waist strap 500 is attached to the right rear edge wall 230, and left rear edge wall 232 of the base 200 by a waist connecting rear strap 552 preferably threaded through the strap slots 226 in base 200, and is fastenable about the waist of a bearer with buckles 551. Padding 553 is fixedly attached to the waist strap 500 for added comfort. A restraining device such as a vehicle seat belt may be attached to the base 200 through the seat belt loops 555 on waist strap padding 553 allowing the base 200 to be held securely upon a seating station such as an automobile seat.

The enclosure 100 may be configured for wearing by an animate bearer, fully freeing the arms and hands as shown in FIGS. 1 and 2. The second end 656 of the first diagonal suspension strap 600 may connect diagonally with the right front base buckle 238 at the first end 757 of the second diagonal suspension strap 700. The second end 759 of the second diagonal suspension strap 700 may connect diagonally with the left front base buckle 240 at the first end 654 of the first diagonal suspension strap 600. This configuration allows the first diagonal suspension strap 600 and the second diagonal suspension strap 700 to preferably fit over the bearer's shoulders in a crossing or "X" pattern, as shown in FIG. 2.

As shown in FIG. 2, padding 660 may be placed under the first and second diagonal suspension straps 600 and 700 for added comfort while wearing. Preferably, the bearer will orient the diagonal suspension straps for shoulder suspension of the enclosure 100, and also attach the waist strap 500. This configuration allows a balanced, arms and hands-free wearing of the pet enclosure which is symmetrical about the sides of the wearer. The bearer is thus able to move with arms and hands free to perform various tasks unrelated to carrying the pet.

Alternatively, if desired, the diagonal suspension straps 600 and 700 could be attached so as not to cross over, with one remaining on the right side and one on the left. As a further alternative embodiment, the enclosure 100 may worn on the back of an animate bearer with the diagonal suspension straps 600 and 700 oriented in the worn configuration, essentially turned around backwards from what is shown in FIGS. 1 and 2.

FIG. 9 shows the first end 654 of the first diagonal suspension strap 600 and the second end 759 of second diagonal suspension strap 700, ready to buckle to the left front base buckle 240 for the worn configuration. A canopy 800 is provided which conforms to the front wall 432 and the top wall 475 of the enclosure 100. The canopy 800 is made of non-transparent material and is preferably positioned with the open side at the rear when full coverage of the front wall 432 and top wall 475 is desired. The canopy 800 may also be positioned with the open side at the front to allow for front visibility and ventilation for the pet while covering the top wall 475. Mating portions of canopy fasteners 886 are fixedly attached to a canopy strap 885 which is capable of securing the canopy 800 over the enclosure 100. When the canopy 800 is in place, the enclosure 100 is protected from outside elements and also the pet is engendered with an even greater sense of shelter. When not in use, the canopy 800 may be folded and stored in one of the rear pouches 443.

The wearable pet enclosure 100 may be oriented on the body of the bearer in a plurality of positions, including but not limited to a dorsal or frontal position as shown in FIGS. 1 and 2, on an animate bearer.

FIG. 10 shows the enclosure 100 attached to the front of a seatback of a vehicular seat with the waist strap 500 and the first diagonal suspension strap 600 and the second diagonal suspension strap 700 and related fasteners configured in essentially the same manner as for wearing by an animate bearer as described above, however the first diagonal suspension strap 600 and the second diagonal suspension strap 700 are shown optionally returning to rear connection points on the base 200. The suspension straps can also be secured to the left and right front base buckles in the manner shown in FIG. 1. The suspension straps can also be configured to attach the enclosure 100 onto the opposite side of a seatback, i.e. the rear side of the seatback. As in the uses of the enclosure 100 previously illustrated, the suspension straps preferably cross in an "X" configuration behind the seatback (or in front of the seatback if the enclosure 100 is positioned on the rear of the seatback). The seatback has "shoulders" which serve to receive the suspension straps much the same as when worn on the human body. The waist strap 500 further stabilizes the the enclosure 100 in position.

Yet a further alternative is to carry the enclosure 100 on the shoulder or in the hand with the diagonal suspension straps 600 and 700 oriented in the hand-carry mode. The enclosure 100 may be configured for hand carrying as shown in FIG. 8. As mentioned supra, the first end 654 of the first diagonal suspension strap 600 is anchored at the left front of base 200. The first end 757 of second diagonal suspension strap 700 is anchored at the right front of base 200. The first diagonal suspension strap 600 and second diagonal suspension strap 700 cross over each other above the wearable pet enclosure 100 to form a hand grasping purchase area at the juncture of the cross over. Shown in FIG. 8, the second end 656 of the first diagonal suspension strap 600 attaches to the base 200 by connecting to right rear base buckle 234. The second end 759 of second diagonal suspension strap 700 attaches to the base 200 by connecting to the left rear base buckle 236. The pet enclosure is then configured for hand carrying or free standing.

Having thus described the invention, it should be apparent that numerous structural modifications and adaptations may be resorted to without departing from the scope and fair meaning of the instant invention as set forth hereinabove and as described hereinbelow by the claims.

While the above description contains many specificities, these should not be construed as limitations on the scope of the invention, but merely as exemplifications of preferred embodiments thereof. Those skilled in the art will envision many other possible variations within its scope. For example the wearable pet enclosure may be constructed 1) without utilizing multiple components to form the enclosure; 2) using solid material such as cage-like components to form the enclosure; 3) with attachment to the animate bearer through some means other than suspension straps. As an alternative to a preferred embodiment, the enclosure may be comprised of one or more components constructed of nonflexible material such as a conventional pet carrier or cage adapted with multiple points of attachment to an animate bearer. Therefore, the features and materials referenced hereinabove of the invention should not be limited to the employment of individual components but rather viewed in its entirety as a whole entity encompassing the essential elements of a wearable enclosure for transporting a pet passenger.

We claim:

1. A wearable pet enclosure for conveying small domestic animals, comprising,
   a rigid base on which a pet is placed,
   enclosure means secured to said base, for shaping a full enclosure on the base, said enclosure means including a mesh of screen-like material,
   access means on said enclosure, for selectively permitting ingress and egress of the pet with respect to the interior of the enclosure,
   suspension means for supporting the weight of the wearable pet enclosure and of an enclosed pet and for enabling an animate bearer to wear the wearable pet enclosure on both shoulders generally centered on the bearer so as to fully free the hands and arms, and, further for maintaining said base in a generally horizontal position, said suspension means including a plurality of suspension straps.

2. The wearable pet enclosure of claim 1, wherein said enclosure means comprises primarily a pervious, light-passing screen-like material, whereby the pet can easily see out and outsiders can easily see in.

3. The wearable pet enclosure of claim 2, wherein said base comprises a rigid platform, sufficiently strong to enable a pet to stand thereon.

4. The wearable pet enclosure of claim 2, wherein said enclosure means includes collapsible structural support means secured to the base, for supporting the pervious screen-like material in fully expanded configuration, and for folding inwardly against the base for compact storage without the pet.

5. The wearable pet enclosure of claim 4, wherein said structural support means include deformable and flexible frame members allowing self-conforming height and shape adjustability of the pet enclosure with a pet contained inside.

6. The wearable pet enclosure of claim 2, further including a means for said enclosure to be removably attached to said base.

7. The wearable pet enclosure of claim 1, wherein said base has a recessed portion surrounded by a plurality of planes which slope down toward said recessed portion, whereby the pet's bodily wastes may be collected for easy removal, and whereby the pet's weight is distributed close to the animate bearer's center of gravity when the pet enclosure is worn with the recessed portion adjacent to the bearer.

8. The wearable pet enclosure of claim 7, wherein the rigid base has an underside with a plurality of feet, whereby with the base placed on the ground or another surface, the feet provide a firm foundation for the pet enclosure.

9. The wearable pet enclosure of claim 8, wherein the plurality of feet includes two front base feet which form concave indentations in the base of sufficient volume to contain water or food inside said enclosure.

10. The wearable pet enclosure of claim 1, wherein the plurality of suspension straps includes a pair of straps each having two ends secured to the rigid base, which is generally rectangular with two front corners, the ends of the straps being secured near the front corners of the rigid base, with each strap extending generally diagonally over the base and the enclosure means so as to define generally an "X" configuration by crossing of the two straps and wherein the two straps are of sufficient length to extend about the shoulders of a bearer with the enclosure means at the front of the bearer, and with the straps crossing at the back of the bearer, whereby the bearer may transport a pet inside the pet enclosure with the bearer's hands and arms free to perform other tasks.

11. The wearable pet enclosure of claim 10, further including a waist strap connected to the base, with means for engaging the waist strap about the waist of a bearer to further secure the wearable pet enclosure to the bearer.

12. The wearable pet enclosure of claim 1, wherein the enclosure means further includes article-retaining pouches on an outside surface of the enclosure means, for receiving and transporting pet accessories.

13. The wearable pet enclosure of claim 12 further including an opaque canopy configured to be received over the enclosure means, for providing protection from the elements for the pet within, and wherein one of said pouches is sized to receive the protective canopy when folded.

14. The wearable pet enclosure of claim 12, including two zippers in the enclosure means, one at a forward location and one at a rearward location of the enclosure means.

15. The wearable pet enclosure of claim 1, wherein said access means comprises at least one zipper in the enclosure means, positioned to provide ingress and egress of a pet as well as entry of a human hand to the interior of the wearable pet enclosure.

16. The wearable pet enclosure of claim 1, including brightly colored contrasting trim at strategic locations for maximum visibility and safety in traffic.

17. The wearable pet enclosure of claim 1, further including a bird perch removably secured to the base and positioned above the base, the bird perch being generally tubular and of sufficient diameter to allow a pet bird to perch thereon.

18. The wearable pet enclosure of claim 1, wherein the rigid base includes a raised edge or flange around its periphery.

19. The wearable pet enclosure of claim 1, wherein the rigid base includes a contoured rear edge, in a position to be engaged and contoured against the torso of a human bearer so as to be comfortably received on the bearer.

20. The wearable pet enclosure of claim 19, further including a waist strap secured to the base at the contoured edge, with means for engaging the strap about a bearer's waist.

21. The wearable pet enclosure of claim 20, wherein the enclosure means includes a flexible fabric material extending above the contoured edge of the base, for engaging comfortably against the bearer.

22. A method for conveying and retaining a small pet closely adjacent to the front or back of the body of a human bearer, while leaving the hands and arms of the bearer fully free for other activities, comprising,
providing a pet enclosure which fully encloses the pet and which has a rigid base,
connecting at least two suspension straps to the pet enclosure, each of sufficient length to extend around and over a shoulder and back or front of the bearer,
placing the straps over the shoulders of the bearer, with the pet enclosure against the front or the back of the bearer, with a first diagonal suspension strap extending from the left front of said base up over one shoulder of the bearer and back to the base, and a second diagonal suspension strap extending from the right front of said base up over the second shoulder of the bearer and back to the base, and supporting the pet enclosure with the straps such that the base is generally horizontal and the pet enclosure is retained centrally on the bearer thus leaving the hands and arms fully free for other activities.

23. The method of claim 22, further including securing a waist strap to the pet enclosure and around the waist of the bearer, thus retaining the pet enclosure more firmly and stably against the body of the user.

24. The method of claim 23, including connecting the straps such that the first diagonal suspension strap has a first end secured to the base near a front left corner of the base and a second end removably connected near a front right corner of the base, and such that said second diagonal suspension strap has a first end secured to said base near a right front corner of the base and a second end removably connected near a front left corner of the base, and with the diagonal suspension straps each passing over one respective shoulder and under the opposite arm of the bearer such that the two diagonal suspension straps cross in an "X" configuration at the back of the bearer.

25. The method of claim 22, wherein the diagonal suspension straps each have first and second ends, and the first ends of the first and second diagonal suspension straps are attached to connection points near the front left and right of the base, and including the further step of connecting the second end of each diagonal suspension strap to the connection points at the rear left and right of the base, thereby configuring the wearable pet enclosure for free-standing, or hand-carrying by gripping the two straps together above the enclosure.

26. The method of claim 22, further including removing the straps from the shoulders of the bearer and hand-carrying the pet enclosure by gripping the two straps together, above the pet enclosure.

27. A method for conveying and retaining a small pet in a vehicle having a seat with a seatback, with the pet secured at an elevated position to the seatback, comprising:

providing a pet enclosure which fully encloses the pet and which has a rigid base, connecting at least two suspension straps to the pet enclosure, each of sufficient length to extend around and over an upper edge of the seatback of the vehicle with the pet enclosure abutted against a front or back surface of the seatback and positioned generally centrally relative to the seatback, placing the straps over the upper edge of the seatback, spaced apart from one another, with the pet enclosure against said front or back surface of the seatback, with a first of said two suspension straps extending from the left front of said base up over the upper edge of the seatback, around a first lateral side of the seatback and back to a connection with the base, and a second suspension strap extending from the right front of said base up over the upper edge of the seatback spaced from the first suspension strap, around an opposite lateral side of the seatback and back to a connection with the base.

28. The method of claim 27, further including securing a third strap generally horizontal to the pet enclosure and around the vehicle seatback generally at the level of said base, thus retaining the pet enclosure more firmly and stably against the vehicle seatback.

29. The method of claim 27, including connecting the two suspension straps such that the first suspension strap has a first end secured to the base near a left front corner of the base and a second end secured to the right side of the base, and such that the second suspension strap has a first end secured to said base near a right front corner of the base and a second end secured to the left side of the base, with the suspension straps crossing at the opposite side of the vehicle seatback relative to the position of the pet enclosure such that the two suspension straps cross in an "X" configuration.

30. The method of claim 29, including securing both second ends of the suspension straps near the rear of the base, near where the base engages against the surface of the vehicle seatback.

31. The method of claim 29, further including securing a third strap generally horizontal to the pet enclosure and around the vehicle seatback generally at the level of said base, thus retaining the pet enclosure more firmly and stably against the vehicle seatback.

32. The method of claim 31, including securing both second ends of the suspension straps near the front of the base, near the connections of the first ends to the base.

33. The method of claim 29, including positioning the pet enclosure against the front side of the vehicle seatback.

34. The method of claim 29, including positioning the pet enclosure against the back side of the vehicle seatback.

35. A pet enclosure for conveying small animals which may be deployed either by wearing the pet enclosure on a user's body or attaching to a similarly shaped object such as a vehicular seat, or by hand-carrying, or free-standing for containment purposes, comprising, enclosure means defining a complete enclosure for containing a pet inside, a rigid base at the bottom of the enclosure means, for stably carrying the weight of the pet and for establishing fixed dimensions at said base of the pet enclosure, the rigid base including base slots, support means for securing the enclosure means to the person of the user, including suspension strap means for engaging over the shoulders of the user in such a way as to retain the pet enclosure generally centrally and symmetrically against the user's body or against a similarly shaped object and in such a way as to leave the hands and arms of the user fully free for other activities, the suspension strap means being removably secured to the rigid base through the base slots, so that the base is supported on the torso of the user with the enclosure means extending above the base, structural means retaining the shape of the enclosure means and comprising at least one flexible rod member secured to the base, and the enclosure means further including a flexible, pervious screen-like material positioned over the flexible rod member and removably secured to the base, and access means on the enclosure means, for selectively permitting entry and exit of a pet to and from the pet enclosure.

36. A pet enclosure for conveying small animals which may be deployed either by wearing the pet enclosure on a user's body or attaching to a similarly shaped object such as a vehicular seat, or by hand-carrying, or free-standing for containment purposes, comprising, enclosure means defining a complete enclosure for containing a pet inside, a rigid base at the bottom of the enclosure means, for stably carrying the weight of the pet and for establishing fixed dimensions at said base of the pet enclosure, the rigid base including base slots, support means for securing the enclosure means to the person of the user, including suspension strap means for engaging over the shoulders of the user in such a way as to retain the pet enclosure generally centrally and symmetrically against the user's body or against a similarly shaped object and in such a way as to leave the hands and arms of the user fully free for other activities, the suspension strap means being removably secured to the rigid base through the base slots, so that the base is supported on the torso of the user with the enclosure means extending above the base, the rigid base including a contoured edge positioned to be engaged against the body of the user, for comfort to the user when wearing the pet enclosure, waist strap means for engaging around the waist of the user, for further stability of the pet enclosure on the user, and access means on the enclosure means, for selectively permitting entry and exit of a pet to and from the pet enclosure.

37. The pet enclosure of claim 36, further including a means for connecting said enclosure to a seatbelt whereby the pet enclosure may be secured on a seat of a motor vehicle.

* * * * *